United States Patent [19]
Patterson

[11] Patent Number: 6,056,027
[45] Date of Patent: May 2, 2000

[54] DRY MATERIAL DISPENSING APPARATUS

[75] Inventor: David R. Patterson, Fort Wayne, Ind.

[73] Assignee: Murray Equipment, Inc., Fort Wayne, Ind.

[21] Appl. No.: 09/175,492

[22] Filed: Oct. 20, 1998

[51] Int. Cl.[7] .................................................. B65B 1/04
[52] U.S. Cl. ............................ 141/370; 141/83; 141/371
[58] Field of Search ..................................... 141/370, 336, 141/83, 371, 372, 375, 311 R, 198

[56] References Cited

U.S. PATENT DOCUMENTS

| | | | |
|---|---|---|---|
| 2,694,515 | 11/1954 | Green | 226/34 |
| 4,164,343 | 8/1979 | Graebner | 251/315 |
| 4,212,331 | 7/1980 | Benatar | 141/67 |
| 4,300,600 | 11/1981 | Tetenborg et al. | 141/10 |
| 4,693,285 | 9/1987 | Chang | 141/83 |
| 4,756,348 | 7/1988 | Moller | 141/83 |
| 4,821,782 | 4/1989 | Hyer | 141/83 |
| 5,431,200 | 7/1995 | Mariotti | 141/83 |
| 5,682,929 | 11/1997 | Maginot et al. | 141/65 |
| 5,803,673 | 9/1998 | Reinsch et al. | 406/31 |

Primary Examiner—David J. Walczak
Attorney, Agent, or Firm—Baker & Daniels

[57] ABSTRACT

An apparatus and method for accurately measuring and dispensing dry material into a portable container. The apparatus includes a frame with a material hopper connected thereto. An arm member with a valve mounted thereto is rotatably connected to the frame and the valve communicates with an outlet in the hopper. A funneling member is positioned proximate to the valve and is also connected to the arm member. Rotation of the arm member opens and closes the valve and also produces substantially vertical movement of the funneling member therewith. The funneling member includes a chute depending downwardly therefrom that inserts into the container opening when a container being filled is placed in the apparatus. The container is placed on a scale which communicates with an attached controller. The controller communicates with an actuator which rotates the arm member and thereby controls movement of the valve and the funneling member. The controller signals the actuator to close the valve at a time when the weight of the container reads a predetermined amount less than the desired amount. As the valve closes, the flow rate of material gradually slows. The valve is sealed at a time corresponding to the weight of the container reaching the desired amount.

22 Claims, 6 Drawing Sheets

FIG_2

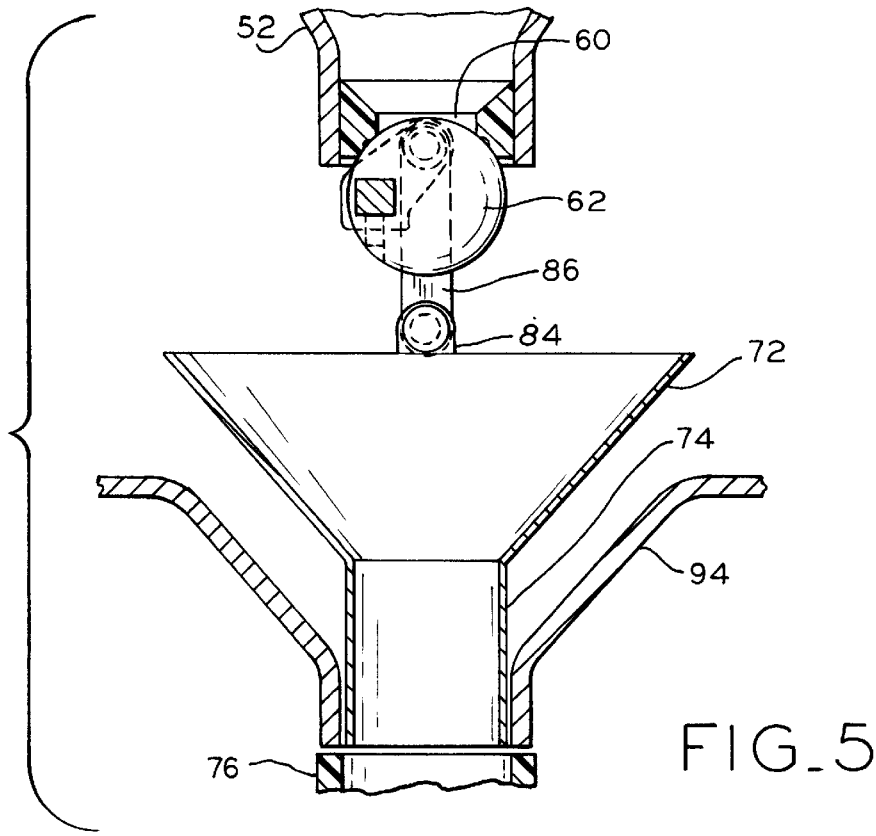
FIG_5
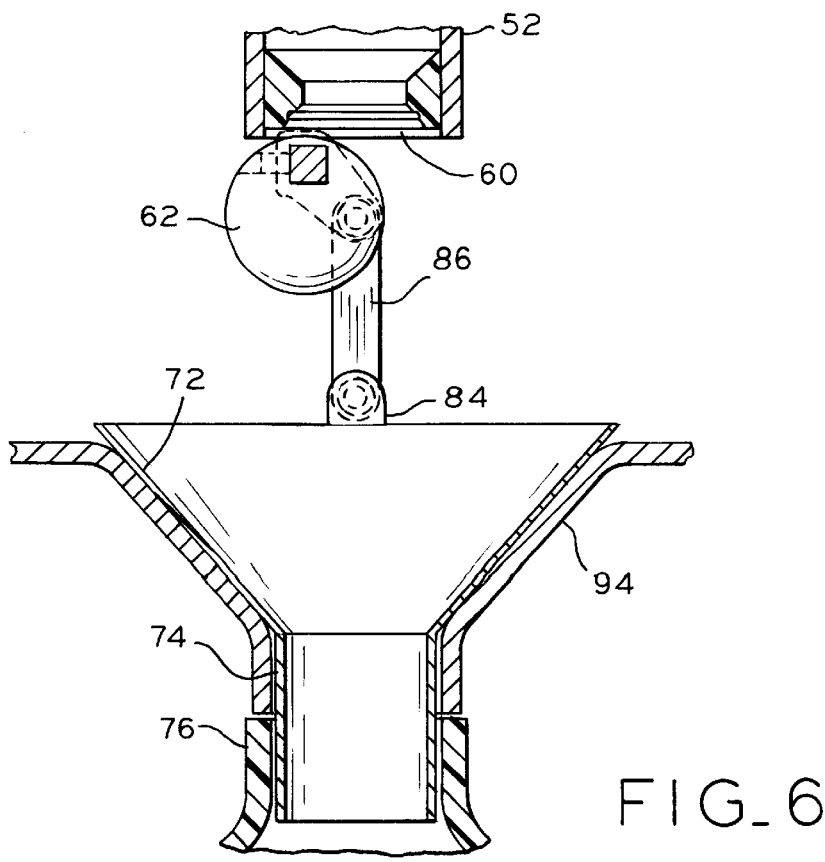
FIG_6

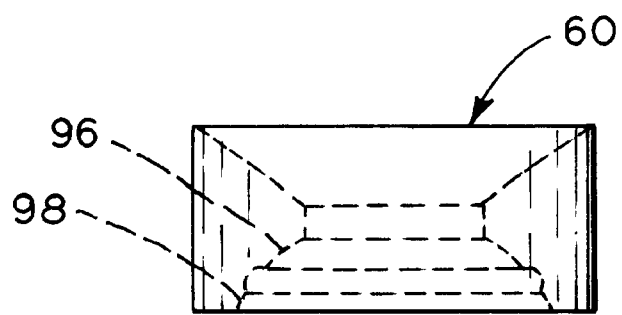
FIG_7
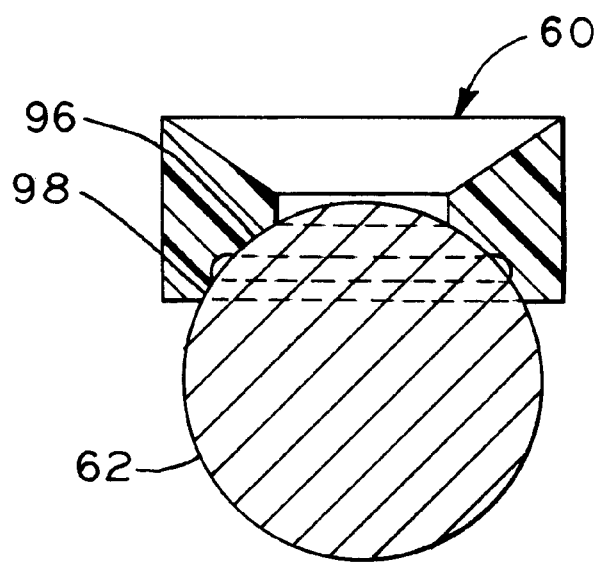
FIG_8

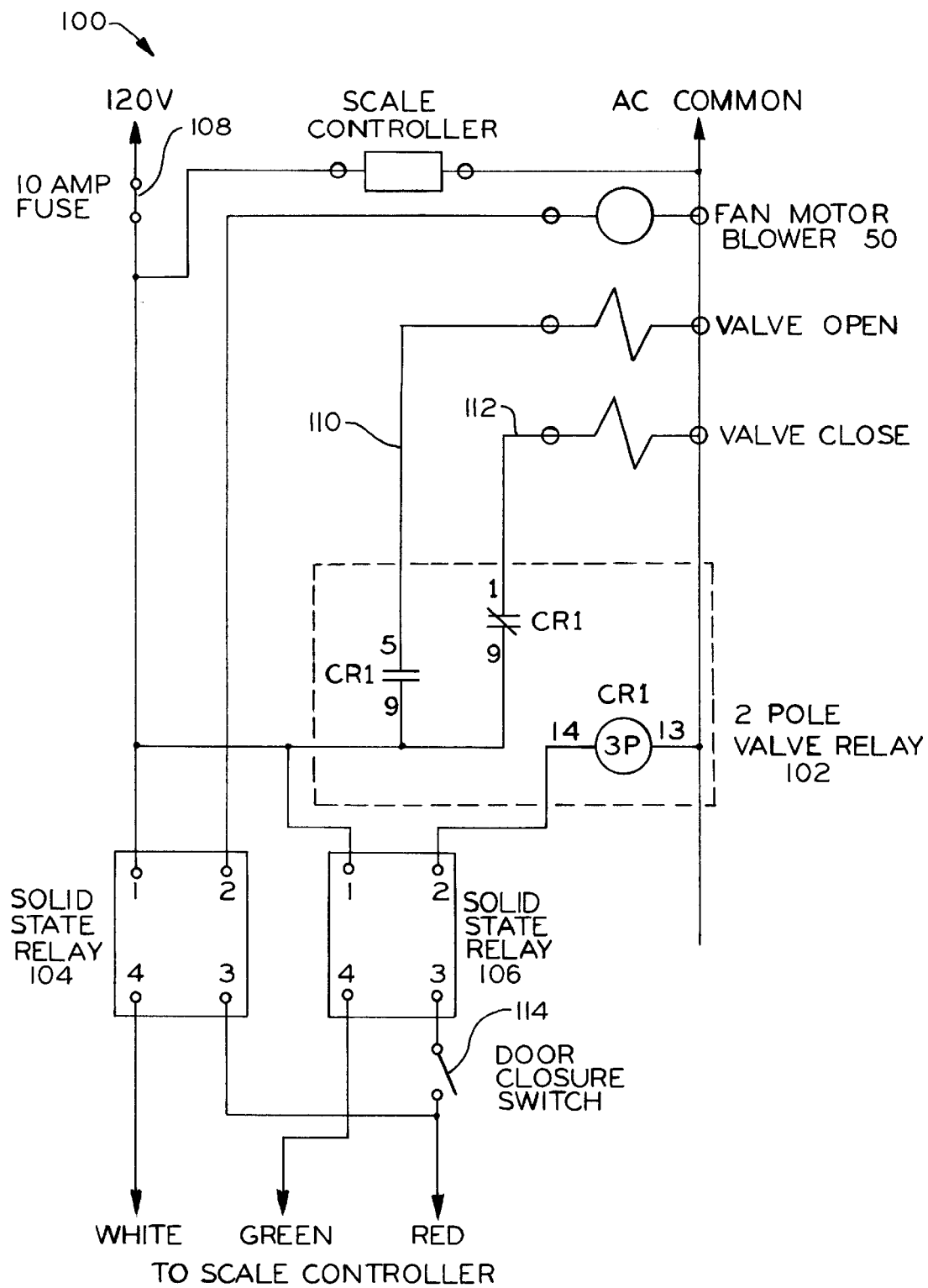
FIG_9

DRY MATERIAL DISPENSING APPARATUS

BACKGROUND OF THE INVENTION

The present invention relates to an apparatus and method for dispensing dry material and, more particularly, to an apparatus and method for accurately measuring and dispensing dry material into a portable container.

Dry agrichemicals, such as herbicides, fertilizers, pesticides, fungicides, and the like, are widely used by the agricultural community in many applications. For example, a farmer wishing to fertilize his planted crops might visit a supplier of agrichemicals and purchase a predetermined amount of dry agrichemical for later dilution to fertilize a given number of acres. In many cases, the farmer will only know the required number of acres to be fertilized. The material supplier will calculate therefrom the amount of dry fertilizer required for the given acreage.

Amazingly, many modern dry agrichemicals are currently concentrated to the extent that a small quantity of material, i.e., a few ounces, can cost several hundred dollars. Because the highly concentrated material is very expensive, it is in the best interest of the supplier and the buyer that the material be measured accurately. Additionally, because the dry agrichemicals are so highly concentrated, exposure thereto can be dangerous. It is thus desirable to avoid direct contact with the materials while measuring and dispensing them. It is further desirable to measure and dispense the materials in an enclosure in order to avoid contact with or breathing of the dust produced by the materials.

U.S. Pat. No. 5,803,673 to Reinsch et al. discloses a device and method for transportation and metering of precise amounts of particulate matter. An outer enclosure which contains the particulate matter is connected by a conduit for transporting the particulate matter in an entrained pneumatic gas stream to a cyclone separator. The separator separates the particulate matter from the pneumatic gas in which the particulate matter is entrained. An air lock, including a rotor having a plurality of vanes, is located within an air lock housing to meter material being dispensed. The air lock is operated by an electrical drive motor and a magnetic proximity switch provides feedback for measuring the amount of particulate matter dispensed.

U.S. Pat. No. 4,756,348 to Moeller discloses an apparatus for controlling discharge of plastic materials from a supply hopper 11 to a blending hopper 14. Material is housed in hopper 11 and is transported through a generally vertical tube to the weigh hopper 14 through a valve means which valve means is controlled by a control assembly. The valve disclosed in the Moeller patent requires three positions. A fully opened position, a partially closed position and a completely closed position. When initially filling the weigh hopper, the valve is opened to the fully open position. When the weight becomes close to the desired amount, a microprocessor activates the control assembly which in turn closes the valve to the partially closed position so that the material exits the tube more slowly. Finally, when the weight of the material in the weigh hopper further approaches the desired quantity, the microprocessor sends a signal which fully closes the valve.

Similarly, U.S. Pat. No. 4,300,600 to Tetenborg et al. discloses an apparatus for filling and weighing large capacity sacks. The sacks are successively suspended from holding devices by their mouths and filled with pourable material through a conduit equipped with a flap. Initially, the flap is only slight opened. When the sack becomes heavy enough to rest upon a support provided, the flap fully opens until the contents of the sack reach a predetermined final weight, whereupon filling is then completed at a trickle rate.

It is desirable in the agricultural industry to provide an economical and highly accurate dispensing and measuring apparatus for dry material.

SUMMARY OF THE INVENTION

The present invention provides an economical but accurate apparatus and method for dispensing a predetermined weight of dry material into a portable container.

In one form, the present invention comprises an apparatus for filling a container with a desired quantity of dry material. The apparatus includes a frame and a material hopper connected to the frame. The hopper includes an outlet at its bottom end. An arm member is movably connected to the frame and a valve is mounted on the arm member. The valve communicates with the outlet in the hopper and is movable between an open position and a closed position. Movement of the valve is caused by movement of the arm member. The valve forms a seal with the outlet in the hopper when the valve is positioned in the closed position. A funneling member is positioned proximate to the valve and is connected to the arm member. Movement of the arm member also produces substantially vertical movement of the funneling member therewith between an upward position and a downward position. It can thus be understood that the funneling member moves in concert with the valve. The upward position of the funneling member corresponds to the closed position of the valve whereas the downward position of the funneling member corresponds to the open position of the valve. The funneling member directs material exiting the hopper into the container when the container is placed below the funneling member.

The above apparatus can be understood with reference to the method of using same. In accordance with the method of the present invention, a hopper having dry material therein and a sealable outlet at its lower end is provided. A scale which provides a weight reading is placed beneath the hopper. The container is placed on the scale and the mouth of the container is positioned below the outlet of the hopper so that material exiting the hopper enters the container. Meanwhile, the weight reading of the scale increases while the container fills. Once the weight reading of the scale reaches a predetermined amount less than the desired amount, the hopper outlet is continuously closed over a predetermined, fixed period of time. In so doing, the hopper outlet is sealed at a time when the weight reading of the scale reads the desired weight. Advantageously, such a method precisely and efficiently provides a container filled with the desired quantity of material.

The precise control of an accurate amount of material exiting the hopper during the closing of the valve is achieved, in a preferred form of the present invention, by a ball valve eccentrically mounted on a rotatable arm member. The arm member is connected to an actuator which provides rotation of the arm member and the ball valve mounted thereon. It has been found that in this arrangement, substantially constant speed movement produced by the actuator in turn produces a gradually decreasing flow rate from the material hopper while the ball valve is moving from the open to the closed position. Additionally, the material flowing from the hopper slows to a rate at which the exact amount flowing therefrom can be accurately controlled—without holding the ball valve in an almost closed position. By contrast, the above-disclosed prior art apparatus require temporarily holding their valves in an almost closed position to acheive a "trickle rate," which is necessary to control the amount of material dispensed into the container.

Indeed, one advantage of the present invention is that it allows continuous, constant speed movement of the ball valve from the open position to the closed position. As a result, the present invention can be economically constructed without loss in accuracy. On the other hand, if the actuator and ball valve were required to stop at an intermediate point, the process would become more complicated and thus more expensive. For example, multiple signals would be need to be transmitted between the scale and actuator and intermediate positions would need to be established and set for the ball valve. Advantageously, however, none of the foregoing is necessary with the present invention.

Another advantage of the present invention is its novel funneling member. In a preferred from, the funneling member includes a chute extending downwardly therefrom which is adapted to be insertable into the container. Simultaneous with the opening of the valve, the chute is lowered into the mouth of the container so that material can be directed therein. Advantageously, the diameter of the chute is smaller than the mouth in the container so that the chute does not contact the container when inserted therein. Thus, the chute does not interfere with the weight readings on the scale on which the container is placed.

Another advantage of the present invention is that, in one form, it recycles valuable dust produced from filling containers in accordance with the present invention. In this form of the present invention, the apparatus includes a material hopper with an outlet at the bottom end thereof connected to the frame. The frame forms an enclosure for the hopper. The frame also includes a base for supporting the container to be filled thereon. The base is disposed below the material hopper, whereby the container can be positioned on the base to receive dry material from the hopper. The frame also forms a chamber surrounding the base, which chamber has a doorway therethrough adapted to receive the container. Advantageously, a conduit connects the chamber to the hopper so that dust produced in the chamber from filling the container can be recycled from the chamber to the hopper.

In a preferred form, the above-described apparatus of the present invention includes a door connected to the doorway which sealingly engages the doorway. The sealing engagement between the door and the doorway forms a non-hermetic seal, which allows air to be drawn into the chamber while the door is closed but prevents dust from escaping from the chamber. A blower is attached to the conduit to draw air into the chamber, through the conduit, and into the enclosure where entrained dust settles into the hopper. Conveniently, a filter is provided in the enclosure surrounding the hopper so that air produced by the blower can exit the enclosure whereas dust is filtered and is thereby prevented from escaping from the enclosure.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 5 is a side sectional view of the valve assembly of FIG. 3, further illustrating the funnel support and parts of the container opening;

FIG. 6 is a side sectional view of the valve assembly of FIG. 4 further illustrating the funnel support and parts of the container opening;

FIG. 7 is a side elevational view illustrating the hopper chute of the present invention with the double seat valve seal;

FIG. 8 is a sectional view of the hopper chute of the present invention and the ball valve of the present invention in sealing engagement therewith; and FIG. 9 is a diagrammatic view of an electrical circuit in accordance with the present invention.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
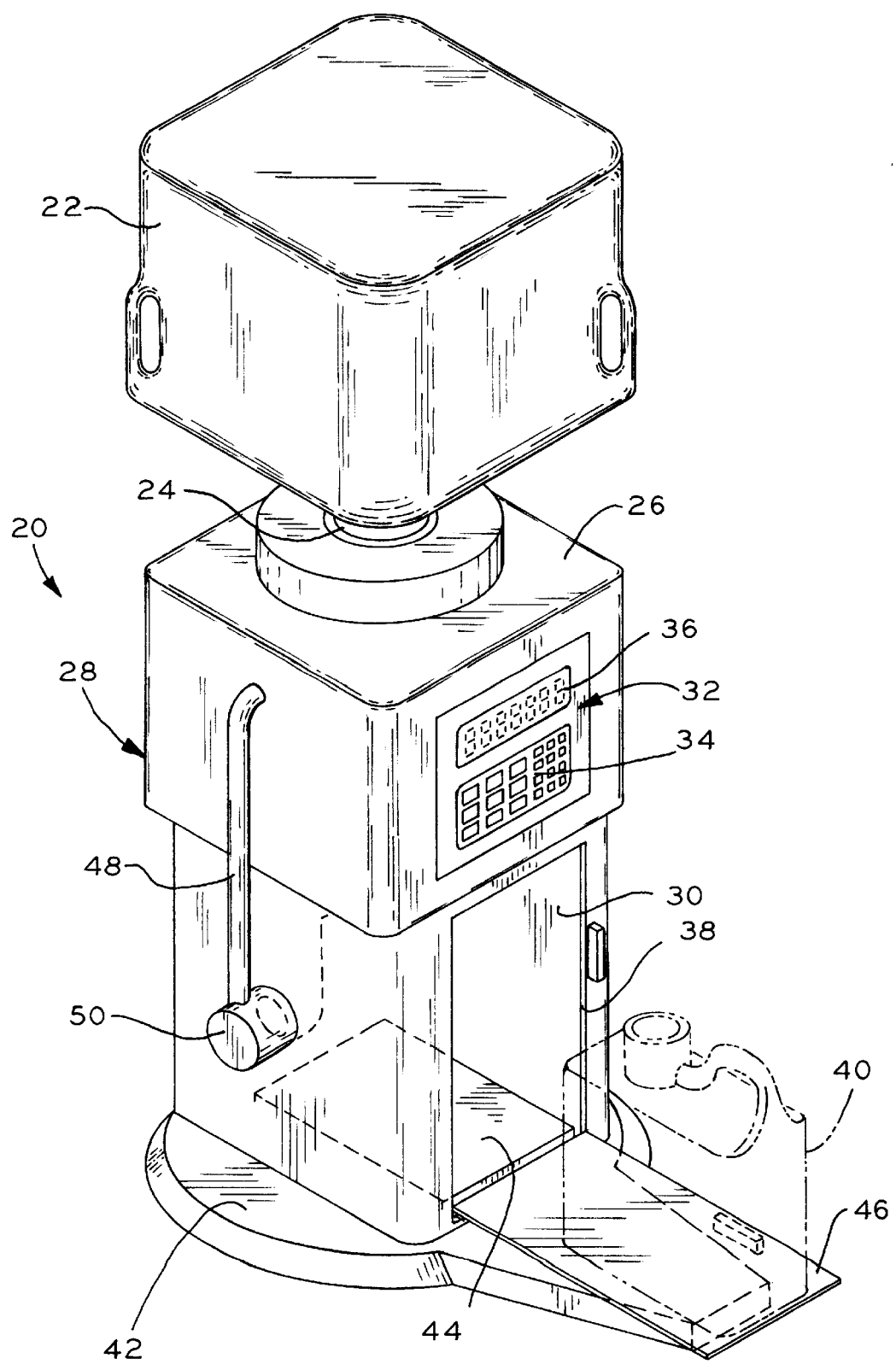
FIG. 1 is a perspective view of an apparatus in accordance with the present invention which shows a material supply drum positioned at the top of the apparatus and a container to be filled by the apparatus shown in phantom.

FIG. 1 shows an apparatus 20 having a material supply drum 22 supported at a top end thereof. Material supply drum 22 typically contains concentrated dry agrichemical such as a herbicide, pesticide or fertilizer. However, many other dry materials could be accurately measured and dispensed with the present invention, such as plastic resins, for example. Apparatus 20 of the present invention includes a fitting 24 which mates with the material supply drum and thereby allows the material in the supply drum to enter enclosure 26. Apparatus 20 employs a "lock and load" connection system as it is commonly called for installing drum 22 onto fitting 24. Once installed, dry powder can freely flow from drum 22 into apparatus 20. The "lock and load" connection system is well known to one of ordinary skill in the art and is therefore not described in detail herein. Frame 28 forms enclosure 26 at a top end of apparatus 20 and chamber 30 at the bottom end of frame 28. Frame 28 is made of polyethylene; however, other suitable polymer or metallic material could alternatively be used for frame 28. Further, the frame can be integrally formed or made from several separate parts. Enclosure 26 includes control panel 32 having buttons 34 thereon for entering the desired weight or other pertinent data for the material to be dispensed. Control panel 32 also includes display 36 which allows the user to easily observe the data being entered into apparatus 20. Control panel 32 is actually the face of a controller (not shown in FIG. 1), described in detail hereinbelow.

Apparatus 20 includes base 42 which further includes a scale 44. Scale 44 is of the type that allows the object to be weighed to be placed thereon. Thus, scale 44 receives container 40 thereon and provides a weight thereof. As noted above, the lower portion of frame 28 forms a chamber 30 having a doorway 38 which receives container 40 therethrough for placement on scale 44. Door 46 is hingedly attached to the bottom of doorway 38 as shown in FIG. 1. In the exemplary embodiment, door 46 sealingly engages doorway 38 but does not form a hermetic seal with the doorway 38, as explained below.

Conduit 48 connects enclosure 26 with chamber 30. Blower 50 attached to the outside of chamber 30 transports air and dust from chamber 30 into enclosure 26 by way of conduit 48. The blower of the illustrated embodiment is a 115 VAC 0.2 amp blower commercially available from Ashland Electric, Rochester, N.H., Catalog No. C4S2H-1C. It is to be understood that one of ordinary skill in the art would readily recognize that various other blowers of similar size and performance may be utilized. The blower operates at 3160 rpm continuously, producing 10–15 CFM @ 0.0 in. static pressure. In order for blower 50 to be able to transport air from chamber 30 to enclosure 26, ambient air must be permitted to enter chamber 30. As noted above, door 46 does not form a hermetic seal with the doorway 38 and as a result, air is permitted to enter through doorway 38 when blower 50 is operating so that dust can be transported from chamber 30 to enclosure 26. It has been found that a nonhermetic seal suitable for the present invention is effected by not placing a gasket between door 46 and the exterior periphery of doorway 38.

Figure 2:
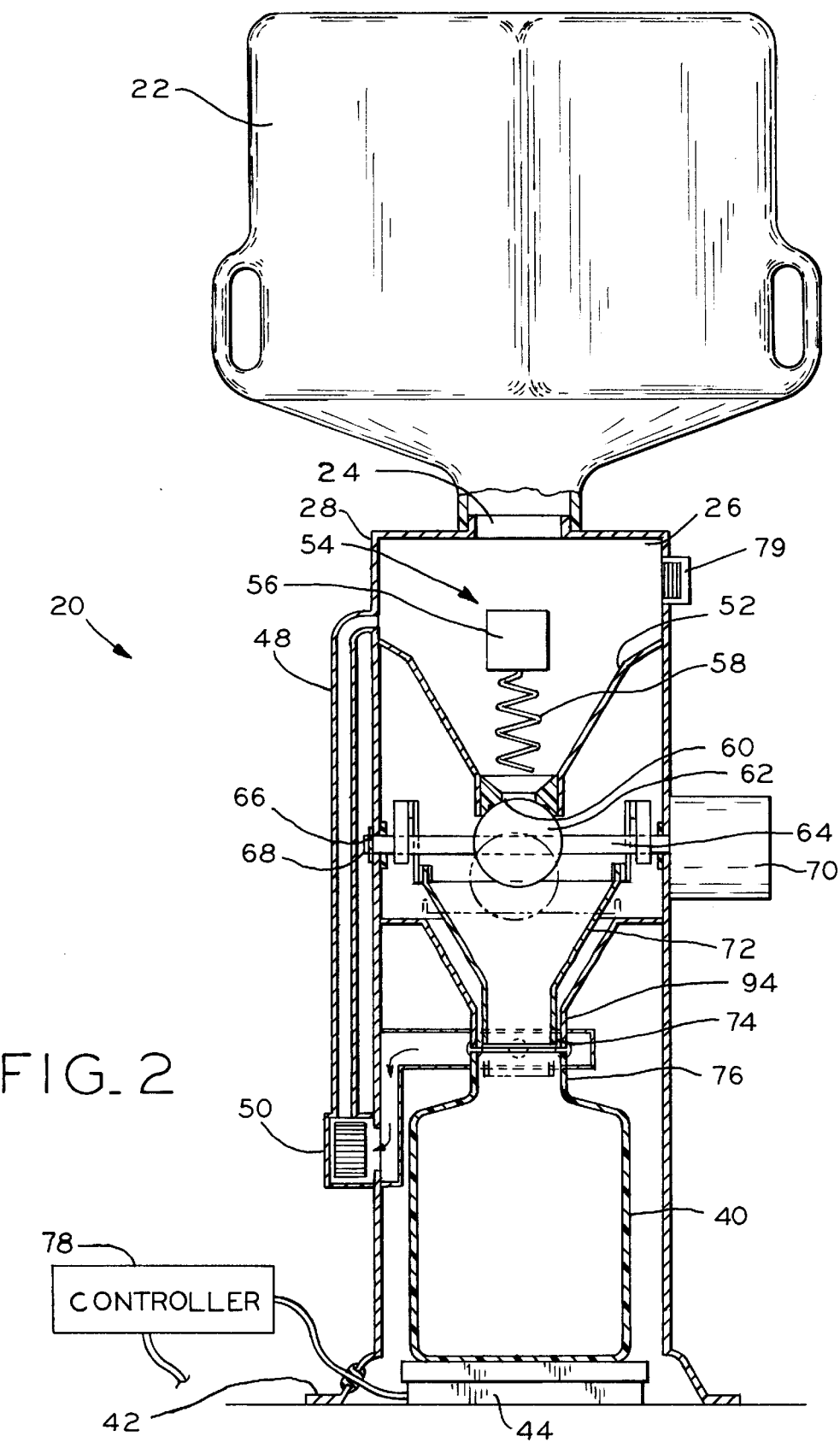
FIG. 2 is a side elevational view in partial diagrammatic form and in partial cross section of the apparatus of FIG. 1.

The advantages of the dispensing apparatus of the present invention can be better understood with reference to FIG. 2, which illustrates a material supply drum 22 connected to fitting 24 on enclosure 26. As discussed above, the "load and lock" connection between material supply drum 22 and enclosure 26 allows material contained in the material supply drum to enter enclosure 26. As further shown in FIG. 2, material hopper 52 is connected to frame 28. Hopper 52 is made from polyethylene, but other suitable materials can also be used to form hopper 52. The walls of the hopper slope at an angle of approximately 60° in the embodiment shown in FIG. 2, but it is to be understood that the sloping angle of the hopper walls can be varied. Hopper 52 can optionally include agitator assembly 54 which further includes agitator motor 56 and agitator arm 58. The agitator assembly 54 prevents material from caking or sticking in hopper 52. The optional agitator assembly is bolted to the interior of hopper 52. Hopper 52 includes an outlet 60 at the bottom end thereof. Ball valve 62 is made from polytetrafluoroethylene, sold under the trademark "TEFLON," and communicates with hopper outlet 60 between an open position and a closed position shown in phantom in FIG. 2.

Arm member 64 is rotatably connected to frame 28 and extends from one side of frame 28 to the other. While arm member 64 is generally rectangular shaped in the embodiment shown, the end of arm member 64 on the left side of frame 28 is cylindrical and inserts into cylindrical bore 66 disposed in frame 28. Suitable nuts 68 and washers can be used to install arm member 64 into frame 28 as shown on the left hand side of FIG. 2. Thus, arm member 64 can rotate about its longitudinal axis. While illustrated in the present embodiment as a rotatable arm member, it is envisioned that the movement of arm member 64 could be other than rotational. For example, arm member 64 could pivot about an end thereof to open and close ball valve 62.

Actuator 70 is attached to frame 28 and is mechanically connected to arm member 64 on the right side of frame 28 as shown in FIG. 2. Actuator 70 is a motor driven actuator which rotates arm member 64 approximately 90° in two opposite directions. That is, actuator 70 turns arm member 64 90° in one direction in one movement and returns arm member 64 90° back to its original position in the second movement. Actuator 70 causes substantially continuous, constant speed movement of arm member 64 and valve 62. An actuator, such as actuator 70, is well known in the art and is available from Milwaukee Controls of Phoenix, Ariz., Model No. MCR100-I.

It is to be understood that one of ordinary skill in the art would readily recognize that various other actuators of similar size and performance may be utilized. Ball valve 62 is eccentrically mounted to arm member 64 so that movement of arm member 64 moves the ball valve between an open position and a closed position. Ball valve 62 forms a seal with the outlet in the hopper when positioned in the closed position, as explained in more detail hereinbelow.

Also shown in FIG. 2, a funneling member 72 is positioned proximate to ball valve 62 and is connected to frame 28 through arm member 64. The connection of funneling member 72 to arm member 64 results in rotational movement of the arm member producing substantially vertical movement of funneling member 72 therewith between an upward position, which corresponds to the closed position of the ball valve, and a downward position, which corresponds to the open position of the ball valve. As shown in FIG. 2, base 42 is disposed below funneling member 72. Thus, when container 40 is placed on base 42 within chamber 30 and aligned with funneling member 72, the funneling member can be used to direct material into container 40. Specifically, funneling member 72 includes a chute 74 depending downwardly therefrom. Chute 74 is smaller than container mouth, or opening 76 so that chute 74 can be inserted into container 40 without the chute contacting mouth 76 of container 40. Advantageously, then, the funneling member of the present invention directs material into container 40 but does not affect the weight of the container or its contents. Further, because the chute inserts into the container, dust formed on the exterior of the container and scale 44 is reduced, in turn increasing the accuracy of the weight reading of scale 44.

In the illustrated embodiment, scale 44 is disposed in base 42 for weighing container 40 and its contents. Thus, scale 44 is of the type that allows placement thereon of the object to be weighed, in this case, container 40. However, it is envisioned that other types of scales could be employed in the practice of the present invention. For example, the scale could be the type wherein the object to be weighed hangs from the scale. The scale used in the illustrated embodiment is commercially available from Rice Lake Weighing Systems, Model BM5.56S-10 (10 lb. capacity). Rice Lake Weighing Systems is located in Rick Lake, Wis. It is to be understood that one of ordinary skill in the art would readily recognize that various other scales having similar performance characteristics may be utilized. The attachment of scale 44 to base 22 can be by any one of many methods known to one skilled in the art.

As shown diagrammatically in FIG. 2, a controller 78 is electrically connected to scale 44 and is also electrically connected to actuator 70, although not shown in FIG. 2. Controller 78 and scale 44 are compatible with one another, in that controller 78 reads and recognizes weight data from scale 44 when connected thereto. The controller used in the illustrated embodiment is commercially available from GSE Scale Systems, Southfield, Mich., Model 455, which has been programmed for the present invention as described hereinbelow. It is to be understood that one of ordinary skill in the art would readily recognize that various other controllers having similar characteristics and capabilities could be utilized in the practice of the present invention.

With reference to FIG. 1, control panel 32 is actually the face of controller 78, although the entire controller 78 cannot be seen in FIG. 1. Controller 78 is programmed so that after a container is placed on scale 44, controller 78, tares scale 44. Controller 78 is programmed to receive either the weight of material to be dispensed or, alternatively, the number of acres on which the dry material is to be applied after dilution. If acreage is entered, controller 78 converts the acreage to a weight. Controller 78 then sends a signal to actuator 70 so that ball valve 62 opens and funneling member 72 moves to the downward position correspondingly. As a result, container 40 fills with dry material. Controller 78 receives and monitors the weight reading of scale 44. As container 40 is being filled, scale 44 continually increases its weight reading. When the weight reading of scale 44 reaches a predetermined amount less than the desired amount, controller 78 sends a shut-off signal to actuator 70. Thus, controller 78 is programmed to send the shut-off signal to actuator 70 before the weight in the container reaches the desired amount. Such is done in order to allow for the additional material which falls from the hopper into the container while valve 62 is closing. In response to the shut-off signal, the actuator rotates the arm member approximately 90° which causes ball valve 62 to move from the open position to the closed position. Simultaneously, the rotation of arm member 64 causes funneling member 72 to move from the downward position to the upward position.

A simple circuit 100 shown in FIG. 9 interconnects controller 78, actuator 70 and blower 50. When the system is first turned on by depressing the appropriate button on control panel 32, 120 volts AC are provided to controller 78, two pole relay 102 and the two solid state relays 104 and 106. Thus, AC power is provided through solid state relay 104 to blower 50 and to two pole valve relay 102 through solid state relay 106. Circuit 100 is protected from surges by a 10 amp fuse 108. As apparatus 20 is operated, controller 78 feeds low voltage signals to solid state relays 104 and 106. A signal from controller 78 to relay 106 causes valve relay 102 to shut or open, sending the appropriate signal to either valve open lead 110 or valve close lead 112. A signal from controller 78 to relay 104 in turn causes a signal to be sent to motor 50 which activates it. Door closure switch 114 opens when door 46 is opened, which causes blower motor 50 to stop and ball valve 62 to close. It is to be understood that one of ordinary skill in the art could use circuits other than circuit 100 which perform the same functions as circuit 100.

As discussed above and further illustrated in FIG. 2, conduit 48 connects from chamber 30 to enclosure 26, or hopper 52. Blower 50 disposed in conduit 48 and communicating therewith causes dust in chamber 30 produced by filling container 40 to be sucked from the chamber and through conduit 48 and then into hopper 52 for recycling. A filter 79 shown diagrammatically in FIG. 2 is installed in enclosure 26 so that air that enters enclosure 26 from conduit 48 can exit to ambient. Filter 79 prevents dust from escaping enclosure 26. Filter 79 is a vacuum air filter, Model No. CSL-824ACP-050HC, available from Solberg Manufacturing, Inc., Hasca, Ill. It is to be understood that other filters may be substituted for filter 79 in the practice of the present invention. Thus, it can be understood that blower 50 causes air to enter doorway 38 through the nonhermetic seal with door 46. The airstream thereby created entrains dust formed in chamber 30 and transports the dust through conduit 48 into enclosure 26, most of the dust settling back into hopper 52. The airstream created by blower 50 exits back into the ambient through filter 79 while suspended dust particles are trapped in filter 79. Thus, the present invention provides a recycling mechanism wherein conduit 48 connects chamber 30 to hopper 52 for recycling dust created by filling operations.

Figure 3:
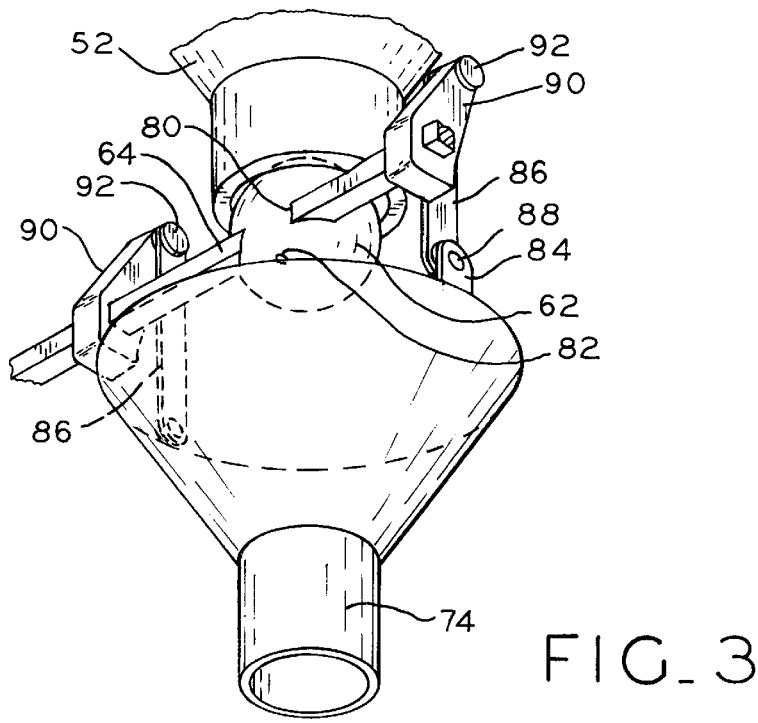
FIG. 3 is a perspective view of the valve assembly including a funneling member of the present invention with the valve shown in the closed position and the funneling member shown in the upward position.
Figure 4:
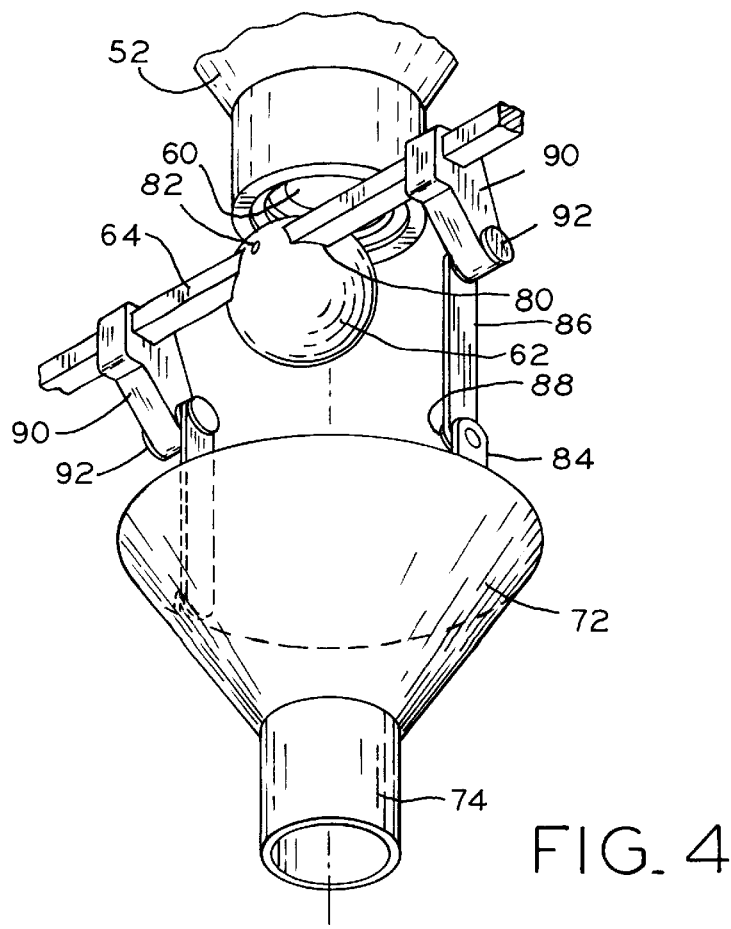
FIG. 4 is a perspective view of the valve assembly of FIG. 3, except that the valve is shown in the open position and the funneling member is shown in the downward position.

The novel mechanism by which the valve assembly and funneling member of the present invention work in concert can be better understood with reference to FIGS. 3 and 4, wherein it can be seen that ball valve 62 is eccentrically mounted to arm member 64. A rectangular opening 80 can be formed in ball valve 62 such that arm member 64 inserts therethrough. Rectangular opening 80 can be formed so that the fit between arm member 64 and rectangular opening 80 is tight so that ball valve 62 resists movement relative to arm member 64. Pin 82, extending into ball valve 62, further secures ball valve 62 to arm member 64 as shown in FIG. 4.

As can be seen in FIGS. 3 and 4, rotation of arm member 64 causes corresponding rotation of ball valve 62 relative thereto so that ball valve 62 moves from the closed position, as shown in FIG. 3, to the open position shown in FIG. 4.

On both sides of funneling member 72 are included tabs 84 to which are connected bands 86 by means of pins 88.

The connection is formed such that tab 84 can pivot relative to band 86. Pins 88 suitable with the present invention are pop rivets, screws, and the like. At the top portion of band 86, as can be best seen in FIG. 4, band 86 connects to lever 90 through pin 92, the connection therebetween being such that band 86 and lever 90 are fully pivotable relative to one another. It can now be appreciated that rotation of arm member 64 causes movement of ball valve 62 as well as substantially vertical movement of funneling member 72 correspondingly. That is, in the exemplary embodiment, ball valve 62 and funneling member 72 move in concert.

The benefits of ball valve 62 moving together with funneling member 72 can best be appreciated with reference to FIGS. 5 and 6. When the ball valve is in the closed position and the funneling member is correspondingly in the upward position as shown in FIG. 5, chute 74 is retracted within funnel support 94 so that container 40 having container opening, or mouth 76 can be positioned directly under chute 74 in chamber 30. When ball valve 62 is opened and funneling member 72 is correspondingly positioned in the downward position as shown in FIG. 6, chute 74 is actually inserted into container opening 76. Advantageously, it can also be appreciated that chute 74, when inserted in container opening 76, does not contact container opening 76. In this manner, chute 74 does not interfere with the reading of scale 44. Yet, at the same time, by inserting chute 74 into container opening 76, the dry material is able to be directed into container 40 without spillage of material. Further, dust produced by the filling operation is reduced.

Of course, it is possible to configure apparatus 20 such that funneling member 72 can be moved independently of ball valve 62. Such would be desirable, for example, when an odd sized container is placed in chamber 30. It is envisioned that a cam/linkage arrangement would be implemented to allow ball valve 62 and funneling member 72 to operate independently of one another.

FIGS. 7 and 8 illustrate a double valve seat of the present invention in which ball valve 62 seats into hopper outlet 60 at two separate locations. The hopper outlet includes a circular first valve seat 96 which circumscribes outlet 60. Ball valve 62 sealingly engages seat 96 when ball valve 62 is in the closed position. Hopper outlet 60 also includes a second valve seat 98 which circumscribes outlet 60 at a different location than does valve seat 96. Specifically, circular valve seat 98 is of larger diameter than valve seat 96. Ball valve 62 sealingly engages seat 98 when ball valve 62 is in the closed position. Optionally, each valve seat can be fitted with a gasket made from an elastomer, such as that available under the trademark "VITON," for example. Such a gasket can enhance the sealing engagement between valve seats 96 and 98, respectively, and ball valve 62. There is an area between the two seats to accommodate dry material when the valve closes, for example when dry material gets past the first valve seat but not the second during closing.

The advantages of the dispensing apparatus of the present invention can be better appreciated with reference to its operation. First, an empty and clean container 40 is placed into chamber 30 on scale 44. Door 46 is closed which puts the unit into a "ready mode." Controller 78 will then be "reset" which will cause the unit to automatically perform a tare check. After the tare check, the user will enter either the acres key or ounces key on the control panel to indicate the desired units to be entered. The user will then enter the desired number corresponding to the desired number of acres or ounces. Once a valid amount has been entered, the display will flash and the start key can be depressed to begin dispensing the desired amount. After the start key is pressed, the unit will automatically open ball valve 62 and allow material to fall into container 40. Simultaneously, blower 50 will automatically activate when valve 62 first opens and remain on for a period of approximately 10 seconds after filling of container 40 has terminated. Once blower 50 has completed its operation, the display of controller 78 will indicate that the filling operation is complete and door 46 may be opened and filled container 40 removed.

Without wishing to be tied to any specific theory, the present invention can be better understood with reference to certain fundamental operational principles. It can readily understood that even though the scale and controller of the present invention are digitally operated, the flow of dry material through outlet 60 and the closing thereof are necessarily mechanical operations. Stated another way, a substantial flow rate of material from hopper 52 cannot be stopped immediately upon the digitized scale reading the desired weight. Instead, the flow must be first slowed to a reduced rate, then stopped at a time corresponding to the weight reaching the desired weight. A traditional approach involves moving the valve to an almost closed position at a time before the weight reaches the desired level and temporarily holding the valve in this position, thereby slowing the flow to a "trickle," which is easier to control. In this traditional approach, the weight will thus gradually approach the desired weight while the valve is held in the almost closed position, whereupon the valve can be completely closed. Remarkably, the present invention does not require the valve to be temporarily held in an almost closed position.

The present invention relates, in principle, to timing the closing of ball valve 62. It has been found that if ball valve 62 is closed at a substantially constant speed over a fixed period of time, the amount of dry material that will pass though outlet 60 during such period of time will be accurately predictable. The calculation will vary depending on the type of material being dispensed because different materials possess different characteristics, such as size, shape and texture, all of which affect the material flow properties. However, for any given material, the material flow properties can be accurately predicted. As a result, the weight of material that will enter container 40 from the time ball valve 62 begins to close until the time ball valve outlet 60 is sealed can also be accurately predicted. Further, with the present invention, it is not necessary to slow or stop the movement of ball valve 62 before completely closing it. Instead, ball valve 62 moves continuously, at a substantially constant speed from the open position to the closed position. As explained in detail hereinbelow, the advantage of the present invention is that the flow rate of material during the closing of ball valve 62 is not constant, but instead gradually decreases with the constant rate closing of ball valve 62.

By knowing that a specific, predictable quantity of material will flow from outlet 60 in the time ball valve 62 moves from the open position to the closed position, apparatus 20 can be "set" for a desired amount of material. The calculation involves simply subtracting the weight of material which flows from hopper 52 during the closing of ball valve 62 from the total weight of desired material. The result, allowing for the weight of container 40, is the "set point" for scale 44. Simultaneous with the scale reaching the set point, controller 78 sends a signal to actuator 70, whereupon actuator 70 closes ball valve 62 over a fixed period of time. In the practice of the present invention, the weight reading of the scale will then read the desired weight at a time corresponding to the sealing of the hopper outlet 60.

To understand the capabilities of the present invention for accurate measurement, it is helpful to examine the flow rate of the material through outlet 60 during the closing of ball valve 62. In the exemplary embodiment, actuator 70 moves ball valve 62 from the open position to the closed position at a substantially constant speed over a period of roughly 2½ seconds. While the actuator used with the present invention moves from the open to the closed position in a period of roughly 2½ seconds, the exact length of time in which the actuator moves from the open to closed position, and vise versa, can be varied by using a different actuator. As mentioned above, unlike the movement of the ball valve, the flow rate of material through outlet 60 is not constant during the closing of ball valve 62. Instead, soon after ball valve 62 begins to close, the flow rate of material through outlet 60 is reduced. As the ball valve continues to close, the flow rate through outlet 60 correspondingly slows. The "trickle rate" and resulting control of material which are traditionally achieved by holding the valve in an almost closed position are achieved in the present invention through substantially constant speed movement of ball valve 62. As a resulting advantage, accurate quantities of material can be dispensed from apparatus 20 without varying the speed at which ball valve 62 moves from its open position to its closed position.

The benefit of the inherent reduction in flow rate occurring during the constant speed closing of ball valve 62 can be appreciated in terms of economic simplicity. The present invention requires only one signal to be transmitted to the actuator and requires only two positions of ball valve 62, viz., open and closed. Upon signaling, the actuator moves the ball valve from the open position to the closed position and shuts off automatically when further movement is prevented. On the other hand, if the actuator were required to stop at an intermediate point, the process would become more complicated and thus more expensive. For example, multiple signals would be required between the controller, scale and actuator and intermediate positions would need to be established and set for ball valve 62. None of the foregoing is necessary with the present invention, however. Instead, the ball valve of the present invention can be closed at a constant speed from the open position to the closed position without sacrificing accuracy. As a benefit, the dispensing apparatus of the present invention can be produced at an economical cost.

While this invention has been described as having an exemplary design, the present invention can be further modified within the spirit and scope of this disclosure. The exemplary embodiment disclosed is used to dispense agrichemicals. However, many other dry materials could be accurately measured and dispensed with the present invention, such a plastic resins, for example. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for filling a container with a desired quantity of dry material, comprising:

a frame;

a material hopper connected to said frame and having an outlet at a bottom end thereof;

an arm member movably connected to said frame;

a valve mounted on said arm member and communicating with said outlet in said hopper, said valve movable between an open position and a closed position by movement of said arm member, said valve forming a seal with said outlet in said hopper when positioned in said closed position;

a funneling member positioned proximate to said valve and connected to said arm member, said movement of said arm member producing substantially vertical movement of said funneling member therewith between an upward position and a downward position, said upward position of said funneling member corresponding to said closed position of said valve and said downward position of said funneling member corresponding to said open position of said valve; and said funneling member adapted to direct material into the container when the container is placed below said funneling member.

2. The apparatus of claim 1, wherein said arm member is rotatably connected to said frame, and said movement of said arm member is rotational movement substantially about a longitudinal axis of said arm member.

3. The apparatus of claim 1, wherein said frame includes a base for supporting the container thereon, said base disposed below said funneling member.

4. The apparatus of claim 3, wherein said funneling member includes a chute depending downwardly therefrom, said chute inserts into the container when the container is placed on said base and said funneling member is positioned in said downward position.

5. The apparatus of claim 3, wherein said frame forms a chamber surrounding said base, said chamber including a doorway adapted for insertion of the container.

6. The apparatus of claim 5, wherein a conduit connects said chamber to said hopper, whereby dust produced by dry material entering the container can be transported from said chamber to said hopper.

7. The apparatus of claim 5, wherein said doorway includes a door attached thereto, said door sealing said chamber when closed.

8. The apparatus of claim 7, wherein said door sealing is a non-hermetic seal.

9. The apparatus of claim 3, wherein said base comprises a scale for weighing the container.

10. The apparatus of claim 9, further including a controller electrically connected to said scale, said controller receiving the weight reading from said scale.

11. The apparatus of claim 10, further comprising an actuator mechanically connected to said arm member and electrically connected to said controller, said actuator producing said movement of said arm member in response to a signal from said controller, whereby said signal causes said valve to move to one of said open position and said closed position, and said signal causes said funneling member to move to one of said downward position and said upward position correspondingly.

12. The apparatus of claim 11, wherein said signal comprises a shut-off signal, whereby said shut-off signal causes said valve to move from said open position to said closed position and causes said funneling member to move from said downward position to said upward position correspondingly.

13. The apparatus of claim 12, wherein said shut-off signal activates when said scale reads a predetermined weight.

14. The apparatus of claim 1, wherein said valve comprises a ball valve.

15. The apparatus of claim 14, wherein:
said arm member is rotatably connected to said frame, said movement of said arm member being rotational movement substantially about a longitudinal axis of said arm member; and
said ball valve is eccentrically mounted to said arm member.

16. The apparatus of claim 14, wherein said outlet in said hopper includes at least two valve seats, whereby said seal between said valve and said outlet includes at least two sealing points.

17. The apparatus of claim 14, wherein:
said frame includes a base for supporting the container thereon, said base disposed below said funneling member; and
said funneling member includes a chute depending downwardly therefrom, said chute inserts into a mouth of the container when the container is placed on said base and said funneling member is positioned in said downward position.

18. The apparatus of claim 17, wherein said chute is smaller than the mouth of the container, whereby said chute does not contact the container when inserted therein.

19. An apparatus for dispensing dry material, comprising:
a frame,
a material hopper connected to said frame and having an outlet at a bottom end thereof,
an arm member rotatably connected to said frame;
a ball valve eccentrically mounted on said arm member and communicating with said outlet, said ball valve movable between an open position and a closed position by rotation of said arm member, said ball valve forming a seal with said outlet when positioned in said closed position; and
whereby, when the container is placed below said outlet and said valve is opened, the container can be filled with the dry material.

20. The apparatus of claim 19, wherein said outlet in said hopper includes at least two valve seats, whereby said seal between said valve and said outlet includes at least two sealing points.

21. The apparatus of claim 20, further comprising an actuator mechanically connected to said arm member, said actuator producing said rotation of said arm member and said movement of said ball valve between said open position and said closed position.

22. The apparatus of claim 19, further comprising:
a funneling member positioned proximate to said ball valve and connected to said frame, said funneling member movable between an upward position and a downward position, said funneling member adapted to direct material into the container when the container is placed below said funneling member.

* * * * *